(12) United States Patent
Azuma et al.

(10) Patent No.: US 12,479,972 B2
(45) Date of Patent: Nov. 25, 2025

(54) RESIN COMPOSITION AND RESIN MOLDED BODY THEREOF

(71) Applicants: INSTITUTE OF SCIENCE TOKYO, Tokyo (JP); KANAGAWA INSTITUTE OF INDUSTRIAL SCIENCE AND TECHNOLOGY, Ebina (JP); CANON KABUSHIKI KAISHA, Tokyo (JP)

(72) Inventors: Masaki Azuma, Tokyo (JP); Yuki Sakai, Kanagawa (JP); Takahiro Kojima, Kanagawa (JP)

(73) Assignees: INSTITUTE OF SCIENCE TOKYO, Tokyo (JP); KANAWA INSTITUTE OF INDUSTRIAL SCIENCE AND TECHNOLOGY, Ebina (JP); CANON KABISHIKI KAISHA, Tokyo (JP)

( * ) Notice: Subject to any disclaimer, the term of this patent is extended or adjusted under 35 U.S.C. 154(b) by 792 days.

(21) Appl. No.: 17/575,896

(22) Filed: Jan. 14, 2022

(65) Prior Publication Data
US 2022/0135764 A1   May 5, 2022

Related U.S. Application Data

(63) Continuation of application No. PCT/JP2020/028236, filed on Jul. 21, 2020.

(30) Foreign Application Priority Data

Jul. 23, 2019   (JP) ................................ 2019-135114

(51) Int. Cl.
| | | |
|---|---|---|
| *C08K 3/22* | (2006.01) | |
| *C01G 53/82* | (2025.01) | |
| *C08K 9/06* | (2006.01) | |
| *G02B 7/02* | (2021.01) | |

(52) U.S. Cl.
CPC ............... *C08K 3/22* (2013.01); *C01G 53/82* (2025.01); *C08K 9/06* (2013.01); *G02B 7/02* (2013.01); *C01P 2006/33* (2013.01); *C08K 2003/2265* (2013.01); *C08K 2003/2293* (2013.01)

(58) Field of Classification Search
None
See application file for complete search history.

(56) References Cited

U.S. PATENT DOCUMENTS

| | | |
|---|---|---|
| 8,664,316 B2 | 3/2014 | Kubota et al. |
| 8,753,749 B2 | 6/2014 | Kubota et al. |
| 8,974,729 B2 | 3/2015 | Kubota et al. |
| 9,353,247 B2 | 5/2016 | Kumagai |
| 10,124,558 B2 | 11/2018 | Kubota et al. |
| 11,613,625 B2 | 3/2023 | Hagimoto et al. |
| 2009/0017280 A1* | 1/2009 | Suzuki ................... B82Y 30/00 428/339 |
| 2012/0037842 A1* | 2/2012 | Kubota ................ C01G 53/006 252/70 |
| 2013/0165573 A1* | 6/2013 | Kojima .................. C08G 64/06 524/413 |
| 2015/0027763 A1 | 1/2015 | Hong et al. |
| 2018/0246302 A1* | 8/2018 | Minefuji ................. G02B 17/08 |
| 2020/0040162 A1 | 2/2020 | Hagimoto et al. |

FOREIGN PATENT DOCUMENTS

| | | | |
|---|---|---|---|
| CN | 108342634 A | 7/2018 | |
| JP | 2013-018975 A | 1/2013 | |
| JP | 2013-249330 A | 12/2013 | |
| JP | 2015-024945 A | 2/2015 | |
| JP | 5795187 B2 | 10/2015 | |
| JP | 2016-023212 A | 2/2016 | |
| JP | 2017-048071 A | 3/2017 | |
| JP | 6143197 B2 | 6/2017 | |
| JP | 2018-031063 A | 3/2018 | |
| JP | 2018-178112 A | 11/2018 | |
| WO | 2012/172918 A1 | 12/2012 | |
| WO | WO-2014030293 A1 * | 2/2014 | ............. C01G 53/40 |
| WO | 2018/189919 A1 | 10/2018 | |
| WO | 2019/087722 A1 | 5/2019 | |
| WO | 2021/015192 A1 | 1/2021 | |

OTHER PUBLICATIONS

Machine translation of WO 2014/030293 (Year: 2014).*
First Office Action in Chinese Application No. 202080052767.2 (Apr. 2023).
Extended European Search Report in European Application No. 20844457.0 (Jul. 2023).
Notice of Reasons for Refusal in Japanese Application No. 2019-135114 (Mar. 2023).
International Preliminary Report on Patentability in International Application No. PCT/JP2020/028236 (Feb. 2022).
International Search Report in International Application No. PCT/JP2020/028236 (Sep. 2020).

* cited by examiner

*Primary Examiner* — Robert T Butcher
(74) *Attorney, Agent, or Firm* — Venable LLP

(57) ABSTRACT

The present invention aims to obtain a resin composition with low thermal expansion property by suppressing functional deterioration in negative thermal expansion property when a negative thermal expansion material is added to a thermoplastic resin and heat-processed. The present invention provides a resin composition including metal oxide particles and a thermoplastic resin, both having a negative thermal expansion property. The negative thermal expansion of the particles is attributed to a crystal phase transition, which is driven by electron transfer between the constituent metals, and a covalent protective layer that inhibits the electron transfer is formed between the particles and the thermoplastic resin.

16 Claims, 3 Drawing Sheets

RESIN COMPOSITION AND RESIN MOLDED BODY THEREOF

CROSS-REFERENCE TO RELATED APPLICATIONS

This application is a Continuation of International Patent Application No. PCT/JP2020/028236, filed Jul. 21, 2020, which claims the benefit of Japanese Patent Application No. 2019-135114, filed Jul. 23, 2019, both of which are hereby incorporated by reference herein in their entirety.

BACKGROUND OF THE INVENTION

Field of the Invention

The present invention relates to a resin composition and a resin molded body thereof. In particular, the present invention relates to a novel resin composition in which a metal oxide having a negative thermal expansion property is added to a thermoplastic resin, and a low thermal expansion member using a resin molded body thereof.

Description of the Related Art

Generally, electronic members, optical members, and structural members are made of materials such as metals, resins, ceramics, and glass. These conventional materials have a positive linear expansion property, and therefore expand and contract in response to rises and falls of the environmental temperature. In particular, since resin materials show a large degree of volume expansion in response to external heat, members using these materials affect the performance of precision equipment.

In order to solve such a problem, the use of a metal oxide having a negative thermal expansion property has been proposed. Metal oxides with negative thermal expansion property, such as zirconium phosphate-based compounds, have been known for a long time, but those metal oxides exhibit a small absolute value of negative coefficient of linear expansion and therefore, the performance is not sufficient to cancel positive thermal expansion of resin materials by addition of such a small amount of those metal oxides that may not impair the original processability of the resin.

However, in recent years, metal oxides having a larger absolute value of negative coefficient of linear expansion have been discovered. These metal oxides can cancel positive thermal expansion of resin materials by addition of a small amount thereof, and the application to some resin materials is disclosed.

For example, Japanese Patent No. 5795187 discloses a resin composition in which a negative thermal expansion material $(Bi_{1-x}M_x)NiO_3$, obtained by substituting some of the Bi atoms in $BiNiO_3$ having a perovskite structure with metal elements M such as lanthanoids, Y, and In, is blended into resin to suppress thermal expansion. However, there are problems that an expensive element is used as the metal element M, so that the production cost is high, and the metal element M is a rare element, so that its supply is unstable. Further, these materials have a problem that the temperature hysteresis is large.

In order to solve these problems, Japanese Patent No. 6143197 discloses a resin composition in which a negative thermal expansion material $Bi(Ni_{1-x}M_x)O_3$, obtained by substituting some of the Ni atoms with metal elements M such as Al, V, Cr, Mn, Fe, Co, and Ga, is blended into a curable resin to suppress thermal expansion.

However, it has been found that when the materials described in Japanese Patent No. 6143197 are blended into a thermoplastic resin, there is a problem that the negative thermal expansion property is lowered during melt extrusion or injection molding processing. An object of the present invention is to suppress functional deterioration in negative thermal expansion property when a negative thermal expansion material is added to a thermoplastic resin and heat-processed.

SUMMARY OF THE INVENTION

A resin composition of the present invention is a resin composition including: metal oxide particles with a negative coefficient of linear expansion at 0° C. to 60° C. (hereinafter also referred to as "negative thermal expansion metal oxide particles"); and a thermoplastic resin with a positive coefficient of linear expansion at 0° C. to 60° C., wherein the metal oxide particles change in metal element valence during crystal phase transition, and a surface of the metal oxide particles is provided with a compound containing at least one metal element selected from Si, Al, and Ti.

Further features of the present invention will become apparent from the following description of exemplary embodiments with reference to the attached drawings.

DESCRIPTION OF THE EMBODIMENTS

Hereinafter, embodiments for carrying out the present invention will be described in detail.

Figure 1:
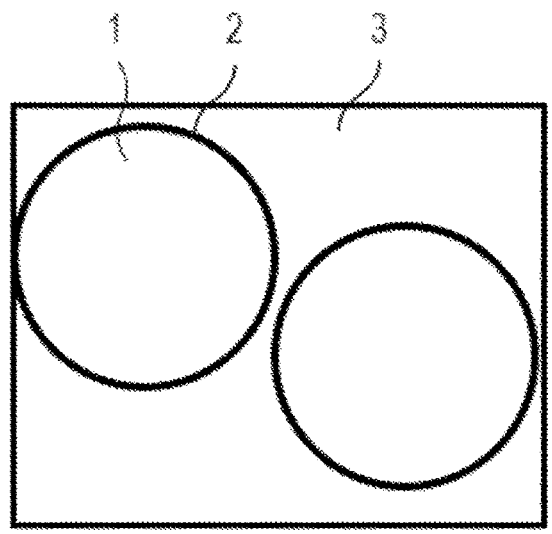
FIG. 1 is a schematic diagram of a resin composition according to an embodiment of the present invention.

As shown in FIG. 1, the resin composition according to the embodiment of the present invention includes metal oxide particles 1 having a negative thermal expansion property and a thermoplastic resin 3, and a covalent protective layer 2 is formed on the negative thermal expansion metal oxide particles.

<Metal Oxide Having Negative Thermal Expansion Property>

The metal oxide contained in the resin composition according to the embodiment of the present invention has a negative thermal expansion property, and the negative thermal expansion is due to a crystal phase transition. Further, the crystal phase transition is driven by electron transfer between constituent metals.

The type of metal oxide exhibiting a crystal phase transition driven by electron transfer between constituent metals is not particularly limited, and a perovskite-type composite metal oxide represented by the general formula (A) is known.

$$(Bi_{1-x1}M^1_{x1})(Ni_{1-x2}M^2_{x2})O_y \qquad \text{General Formula (A)}$$

Here, $M^1$ is at least one metal element selected from the group consisting of lanthanoids, Y, and In, and $M^2$ is at least one metal element selected from the group consisting of Al, V, Cr, Mn, Fe, Co, Ga, and Sb. Further, x1, x2, and y are such that x1 is 0.02 or more and 0.15 or less, x2 is 0.02 or more and 0.50 or less, and y is 3 or less.

Further, the perovskite-type composite metal oxide may be a perovskite-type metal oxide represented by the general formula (B).

$$BiNi_{1-x}M^3{}_xO_y \qquad \text{General Formula (B)}$$

Here, in the general formula (B), $M^3$ is at least one metal element selected from the group consisting of Al, V, Cr, Mn, Fe, Co, Ga, and Sb. Further, x and y are such that x is 0.02 or more and 0.50 or less, and y is 3 or less. The metal oxide represented by the general formula (B) does not use a rare element, and thus has the advantages of excellent production cost and supply stability, and low temperature hysteresis.

Further, it is more preferable that $M^3$ in the general formula (B) is Fe. When $M^3$ is Fe, the perovskite-type metal oxide represented by the general formula (B) has crystal phase transition temperatures with volume contraction for temperature rise and volume expansion for temperature fall within the range of −50° C. to 200° C., and therefore the thermal expansion of the resin can be effectively suppressed under practical conditions near room temperature.

The metal oxide represented by the general formula (B) means a composite metal oxide of Bi, $M^3$, and Ni. In other words, some of the nickel sites of bismuth nickelate represented by the general formula $BiNiO_3$ are replaced with $M^3$. Note that if x is less than 0.02, the perovskite-type metal oxide represented by the general formula (B) cannot obtain a sufficient negative thermal expansion property.

The mechanism by which negative thermal expansion is exhibited will be described by taking the general formula (B) as an example. $BiNiO_3$, which is the base substance of this compound, is a perovskite-type composite metal oxide having a characteristic valence state of $Bi^{3+}{}_{0.5}Bi^{5+}{}_{0.5}Ni^{2+}O_3$. In the perovskite structure, the Ni—O bond forms the skeleton of the crystal structure, and Bi fills the gap.

By substituting some of the Ni atoms with $M^3$, which is a metal element having a stable trivalent value, the valence state of $Bi^{3+}{}_{0.5}Bi^{5+}{}_{0.5}Ni^{2+}O_3$ becomes unstable. As a result, the temperature rise causes a change to the valence state of $Bi^{3+}(Ni,M)^{3+}O_3$, and when Ni—O contracts with the valence change from $Ni^{2+}$ to $Ni^{3+}$, the entire volume contracts. That is, the negative thermal expansion property of the metal oxide according to the present embodiment is achieved by the crystal phase transition driven by the electron transfer between the constituent metals.

In the resin composition according to the embodiment of the present invention, the negative thermal expansion metal oxide has a particle shape, and the shape may be any shape such as a spherical shape, a plate shape, or a needle shape. Assuming that the particles are spheres of the same volume, the number average particle diameter of the spheres is preferably 0.002 μm or more and 2 mm or less, more preferably 0.01 or more and 0.2 μm or less, and further preferably 0.04 μm or more and 0.1 μm or less. In the case of 0.01 μm or more and 0.2 μm or less, aggregation and sedimentation of particles are suppressed at the same time, and uniform dispersion is possible. In the case of 0.04 μm or more and 0.1 μm or less, the resin composition has a material viscosity suitable for thermoforming and makes it possible to obtain a molded article having good surface properties.

<Protective Layer>

The electron transfer between the constituent metals of the metal oxide particles exhibiting negative thermal expansion is reversible, and even when the negative thermal expansion metal oxide particles are in a single state or mixed/composited with other substances, their reversibility is not lost when the temperature changes near room temperature. However, when the negative thermal expansion metal oxide particles and the thermoplastic resin are composited and the surroundings are in a reducing atmosphere, the negative thermal expansion reversibility of the metal oxide is lost at a certain temperature or higher, and its function is deactivated.

Although the mechanism of the loss of reversibility has not yet been clarified, it is surmised that in the compound represented by general formula (A) and the compound represented by general formula (B), the metal atoms are in a highly oxidized state, and thus react at high temperatures with a thermoplastic resin having oxidizable C—H bonds, especially easily-oxidizing aliphatic chains, and are easily reduced by hydrides.

In order to prevent the reduction of the negative thermal expansion metal oxide particles, the negative thermal expansion metal oxide particles contained in the resin composition according to the embodiment of the present invention are provided with a compound on the surface thereof that inhibits electron transfer between the metal oxide particles and the thermoplastic resin. Here, the compound that inhibits electron transfer is preferably a compound containing at least one metal element selected from Si, Al, and Ti. Further, it is preferable that a compound that inhibits electron transfer between the metal oxide particles and the thermoplastic resin is provided on the surface of the negative thermal expansion metal oxide particles as a covalent protective layer. Here, the covalent protective layer means that the protective layer is formed by covalent bond rather than metal bond or ionic bond. Further, the outer shell side of the protective layer that does not bond with the negative thermal expansion metal oxide particles preferably has an organic structure having high compatibility with the thermoplastic resin composition. Furthermore, it is more preferable that the protective layer has a coupling effect of chemically bonding the negative thermal expansion metal oxide particles and the thermoplastic resin.

At the interface between the negative thermal expansion component and the positive thermal expansion component, where the expansion and contraction behavior at the time of temperature change is opposite, peeling is likely to occur and it is difficult to follow each expansion and contraction behavior. The protective layer chemically bonds the negative thermal expansion metal oxide particles and the thermoplastic resin, whereby the volume change of the negative thermal expansion metal oxide particles at the time of temperature change is transmitted to the thermoplastic resin, and the effect of effectively suppressing the thermal expansion of the resin can be expected.

In the step of providing a compound containing at least one metal element selected from Si, Al, and Ti on the surface of negative thermal expansion metal oxide particles, it is difficult to use as a catalyst an acid or base that can react with the negative thermal expansion metal oxide particles, and thus an alkoxide compound that reacts under neutral conditions is preferable.

Examples of the compound containing at least one metal element selected from Si, Al, and Ti include a condensate of an alkoxide compound represented by the general formula (1) or the general formula (2).

$$SiR1_{n1}R2_{m1} \qquad \text{General Formula (1)}$$

In the general formula (1), R1 is a functional group selected from any of methyl group, methoxy group, and ethoxy group, and R2 is a functional group having 8 or less carbon atoms and having an end portion selected from any of epoxy, amine, imine, and (meth)acryloxy groups. Further, n1 is a positive integer, m1 is a positive integer or 0, and n1+m1 is 4. When n1 and m1 are each an integer of 2 or more, the multiple R1's and R2's may each be the same or different.

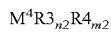 General Formula (2)

In the general formula (2), M⁴ is Al or Ti, R3 is a functional group selected from alkyl groups having 8 or less carbon atoms and alkoxy groups having 8 or less carbon atoms, R4 is a functional group having 8 or less carbon atoms and having an end portion selected from any of epoxy, amine, imine, and (meth)acryloxy groups, phosphoric acid esters, and sulfonic acid ester. Further, when M⁴ is Al, n2 is a positive integer, m2 is a positive integer or 0, and n2+m2 is 3. When M⁴ is Ti, n2 is a positive integer, m2 is a positive integer or 0, and n2+m2 is 4. When n2 and m2 are each an integer of 2 or more, the multiple R3's and R4's may each be the same or different.

In the general formula (1) and the general formula (2), R2 and R4 are each preferably a functional group having an epoxy or amine at the end and having 8 or less carbon atoms, and the amine is preferably a secondary amine. Further, R2 and R4 are each more preferably a functional group having an epoxy at the end and having 8 or less carbon atoms.

Specific examples of the alkoxide compound represented by the general formula (1) or the general formula (2) include silanols such as silane coupling agents, alkyl alkoxy silanes, tetraethoxy silanes, and silazanes, and coupling agents such as aluminates and titanates.

Further preferably, the protective layer is formed of a condensate of the alkoxide compound represented by the general formula (1), and n1 is 2 or 3 and m1 is 2 or 1 in the general formula (1). These silanols can form a covalent bond between silanols by a condensation reaction and also a covalent bond with a metal oxide, so that a chemically stable protective layer can be obtained.

Among these silanols as the alkoxide compound represented by the general formula (1), typical commercially available ones include 3-glycidoxypropyltrimethoxysilane, 3-glycidoxypropylmethyldimethoxysilane, 2-(3,4-epoxycyclohexyl)ethyltrimethoxysilane, 3-aminopropyltrimethoxysilane, 3-aminopropyltriethoxysilane, 3-(2-aminoethylamino)propyltrimethoxysilane, 3-phenylaminopropyltrimethoxysilane, and the like. Further, multiple of the alkoxide compound represented by the general formula (1) may be used in combination.

Some of these silanols are widely used as coupling agents, and it is known that they can be used as adhesion agents between inorganic particles and resins, and can be used to form a protective layer that that suppresses the reaction between inorganic particles and oxygen, that is, oxidation. In the present invention, it is hypothesized that it is important to suppress the reduction of the metal oxide from the phase transition mechanism of the negative thermal expansion metal oxide, and by forming a protective layer on the surface of the metal oxide, it has been achieved to improve the thermal stability of the negative thermal expansion metal oxide particles in the resin composition.

When a protective layer is to be provided on the negative thermal expansion metal oxide particles by the condensation reaction of the alkoxide compound represented by the general formula (1) or the general formula (2), either a dry method or a wet method may be used. The wet method is particularly preferable.

A typical procedure for the dry method is to use an agitator such as a Henschel mixer or a ball mill to add negative thermal expansion metal oxide particles, an alkoxide compound represented by the general formula (1) or the general formula (2), and a small amount of alcohol-based solvent as needed, stir, and heat to 100° C. or higher, whereby the dehydration-condensation reaction proceeds to form a protective layer.

A typical wet process procedure is to add negative thermal expansion metal oxide particles to an alcohol-based solvent, and sequentially add the alkoxide compound represented by general formula (1) or the general formula (2) while stirring with a stirrer or the like. In order to form a uniform protective layer on the surface, a disperser such as an ultrasonic vibrator, a homogenizer, a jet mill, a ball mill, or a bead mill may be used in combination. After the elapse of a predetermined time of about 10 minutes to several hours, the negative thermal expansion metal oxide particles are recovered by filtration, centrifugation, or the like, and heated to 100° C. or higher to proceed with the dehydration-condensation reaction to form a protective layer.

The formation of the protective layer can be confirmed by known methods such as energy dispersive X-ray analysis (EDX), X-ray photoelectron spectroscopy (ESCA), and infrared absorption (IR) spectrometry. The protective layer preferably covers the entire surface of the negative thermal expansion metal oxide particles, but if it is possible to inhibit electron transfer between the negative thermal expansion metal oxide particles and the thermoplastic resin, it may be provided so as to partially cover the surface of the negative thermal expansion metal oxide particles.

<Thermoplastic Resin>

The thermoplastic resin used in the resin composition according to the embodiment of the present invention is a resin having a positive coefficient of linear expansion at 0° C. to 60° C. Usually, available resin materials have a positive coefficient of linear expansion at 0° C. to 60° C. A crystalline resin having an orientation-dependent coefficient of linear expansion or a fiber-reinforced resin having a coefficient of linear expansion close to that of a metal in the orientation direction can also be used in the present invention.

Examples of types of thermoplastic resins include resins, such as ester resins such as polycarbonate resins, cycloolefin resins, polystyrene resins, polyolefin resins, polybutylene terephthalate, and polyethylene terephthalate, unsaturated polyester resins, polyamides such as polyimides, polyamide-imides, and polyetherimides, and aromatic polyetherketones such as polyvinyl chloride, ABS resin, fluororesin, liquid crystal polymer, polyphenylene sulfide, polysulfones, polyethersulfone, and polyether ether ketone. These resins may be mixed and used.

More preferably, a resin selected from polycarbonate resins, cycloolefin resins, and polystyrene resins can be used. Since these resins are amorphous resins and have a low saturated water absorption rate, it is possible to obtain a resin composition suitable for producing an optical molded article having small molding shrinkage and high dimensional stability against changes in humidity.

<Method of Producing Resin Composition>

The method of producing the resin composition according to the embodiment of the present invention is not limited to a specific method, and a mixing method generally employed for resin compounds can be used. For example, production is possible by kneading a thermoplastic resin with negative thermal expansion metal oxide particles provided with a compound containing at least one metal element selected from Si, Al, and Ti on the surface thereof (hereinafter also simply referred to as "compound" in this section), that is, coated with a protective layer using a mixer such as a tumbler, a V-type blender, a Banbury mixer, a kneading roll, a kneader, a single-screw extruder, or a multi-screw extruder with two or more shafts.

Further, production is also possible by adding an organic solvent to the thermoplastic resin to dissolve it, and then adding negative thermal expansion metal oxide particles coated with a protective layer to disperse them, removing the solvent under reduced pressure, and heating and drying the mixture under reduced pressure. As a method of more uniformly dispersing the particles, for example, an agitator such as a stirrer and an ultrasonic vibrator can be combined, or a disperser such as a homogenizer, a jet mill, a ball mill, or a bead mill can be used.

In the production of the resin composition, several components of the negative thermal expansion metal oxide particles coated with a protective layer, thermoplastic resin, and additional additives used as needed may be pre-mixed or pre-kneaded, or may be mixed or kneaded simultaneously.

The additional additives include inorganic fillers/fibers other than metal oxides showing negative thermal expansion, lubricants/mold release agents such as fatty acid amides, fatty acid esters, and metal salts of fatty acids, ultraviolet absorbers such as benzotriazole-based compounds, benzophenone-based compounds, and phenyl salicylate compounds, hindered amine-based stabilizers, phenol-based and phosphorus-based antioxidants, tin-based heat stabilizers, various antistatic agents, slidability improvers such as polysiloxane, colorants of various pigments and dyes typified by titanium oxide and carbon black, and plasticizers such as waxes and silicone resins.

The amount of these additives added is preferably 10% by mass or less, more preferably 5% by mass or less, based on the obtained resin composition. When the amount of these processing aids added is large, the processing aids may elute from the obtained molded article, and the thermal expansion of the resin composition is also affected.

In the resin composition according to the embodiment of the present invention, the volume fraction of the negative thermal expansion metal oxide particles in the total components of the resin composition is preferably in the range of more than 10% by volume and 50% by volume or less. More preferably, it exceeds 20% by volume and 35% by volume or less. If the volume fraction of the negative thermal expansion metal oxide particles is too small, the positive thermal expansion of the thermoplastic resin cannot be sufficiently canceled, and if 50% by volume is exceeded, the mechanical properties inherent in the thermoplastic resin are impaired. If the resin molded body of the resin composition is obtained by injection molding, from the viewpoint of melt viscosity, the volume fraction of the negative thermal expansion metal oxide particles in all the components is more preferably 23% by volume or more and 33% by volume or less.

Here, the volume fraction of the negative thermal expansion metal oxide particles in all the components of the resin composition can be obtained by calculating the sum of the mass fraction divided by the specific gravity of each of the constituent materials, and then dividing the mass fraction of the negative thermal expansion metal oxide particles by the specific gravity of the metal oxide and by the aforementioned sum.

The constituent ratios and components of the resin composition according to the embodiment of the present invention can be determined by combining known separation techniques and analysis techniques. The method and procedure therefor are not particularly limited, but as an example, a solution obtained by extracting an organic component from a thermoplastic resin composition can be analyzed for each component after the components are separated by various chromatographic methods or the like.

In order to extract the organic component from the resin composition, the resin composition may be immersed and dissolved in a solvent capable of dissolving the organic component. By finely crushing the resin composition or heating and stirring the solvent in advance, the time required for extraction can be shortened.

The solvent to be used can be arbitrarily selected according to the polarity of the organic components constituting the resin composition, and aromatic solvents such as toluene and xylene, and solvents such as tetrahydrofuran, dioxane, methylene chloride, chloroform, N-methylpyrrolidone, and hexafluoro-2-propanol are preferably used. Further, these solvents may be mixed and used in an arbitrary ratio.

Here, the content of the inorganic component contained in the resin composition can be determined by drying and weighing the residue remaining after separating the organic component. As another method of determining the content of the inorganic component in the resin composition, there is also a method of quantifying the ash content by raising the temperature to one equal to or higher than the decomposition temperature of the resin by thermogravimetric analysis (TGA) or the like.

In addition, the elements contained in the metal oxide and their constituent ratios can be determined by performing fluorescent X-ray analysis of the dried sample of the residue remaining after extracting the organic component. Further, the constituent components of the protective layer of the metal oxide can be determined by analyzing the residue by a known method such as nuclear magnetic resonance (NMR) spectrometry, infrared absorption (IR) spectrometry, Raman spectrometry, mass spectrometry, and heated gas chromatography.

In the production process and molding process of a resin composition to be heated by melt kneading or the like, the processing temperature can be arbitrarily set according to the type and performance of the processing apparatus, and the properties of the thermoplastic resin, the negative thermal expansion metal oxide particles, and the components of additional additives used as needed. The processing temperature is usually 100 to 300° C., preferably 120 to 270° C., and more preferably 140 to 250° C. If this temperature is too low, the viscosity becomes high and processing is difficult, and if the temperature is too high, thermal decomposition of the constituent components becomes a problem, which may cause deterioration of physical properties and poor appearance of the molded article.

The resin molded body according to the embodiment of the present invention can be obtained by molding the resin composition according to the embodiment of the present invention. The method of molding the resin molded body is not limited to a specific method, and a method generally employed as a molding method of a thermoplastic resin can be used. For example, melt extrusion molding, injection molding, vacuum molding, press molding, and the like can be used.

By using the resin composition according to the embodiment of the present invention, the coefficient of linear expansion of the resin molded body according to the embodiment of the present invention at 0° C. to 60° C. can be greater than 0 ppm/° C. and 45 ppm/° C. or less.

The resin molded body according to the embodiment of the present invention can be used as a structural material, a recording material, an electronic material, and an optical material with suppressed thermal expansion. In particular, it can be suitably used for optical molds, optical elements, barrels, and mirrors related to the optical accuracy of optical devices such as image pickup devices, condensing devices, exposure devices, and optical observation devices. Below, a catoptric element and an optical device are shown as an example.

(Catoptric Element)

Figure 2:
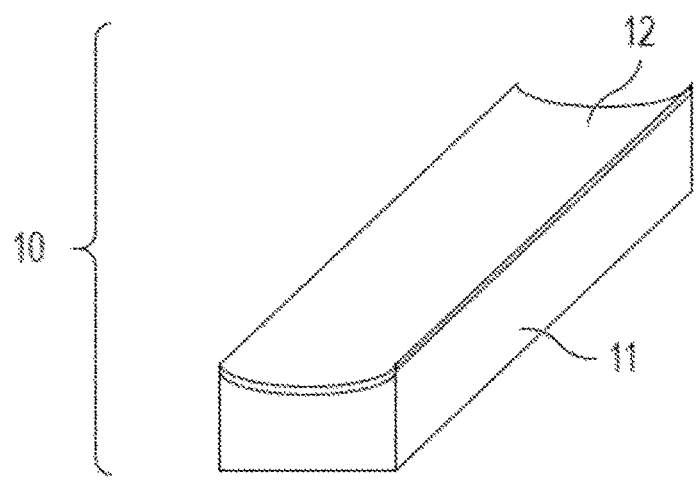
FIG. 2 is a schematic perspective diagram of a catoptric element according to an embodiment of the present invention.

FIG. 2 is a schematic perspective view of a catoptric element according to an embodiment of the present invention. The catoptric element 10 includes a base material 11 and a reflective film 12 formed on the base material. The reflective film 12 is, for example, a reflective film 12 made of aluminum, silver, chromium, or the like. From the viewpoint of high reflectance, the reflective film 12 is made of preferably aluminum or silver, and more preferably silver. The reflective film 12 may be provided with a protective film, a high reflective film, or the like on the surface thereof, and various film configurations can be used within a range exhibiting desired characteristics.

The resin molded body according to the embodiment of the present invention can be used for the base material 11. Since the resin molded body of the present invention has a small coefficient of linear expansion, it is possible to provide a catoptric element 10 having a small volume change due to a temperature change.

(Optical Device)

Figure 3:
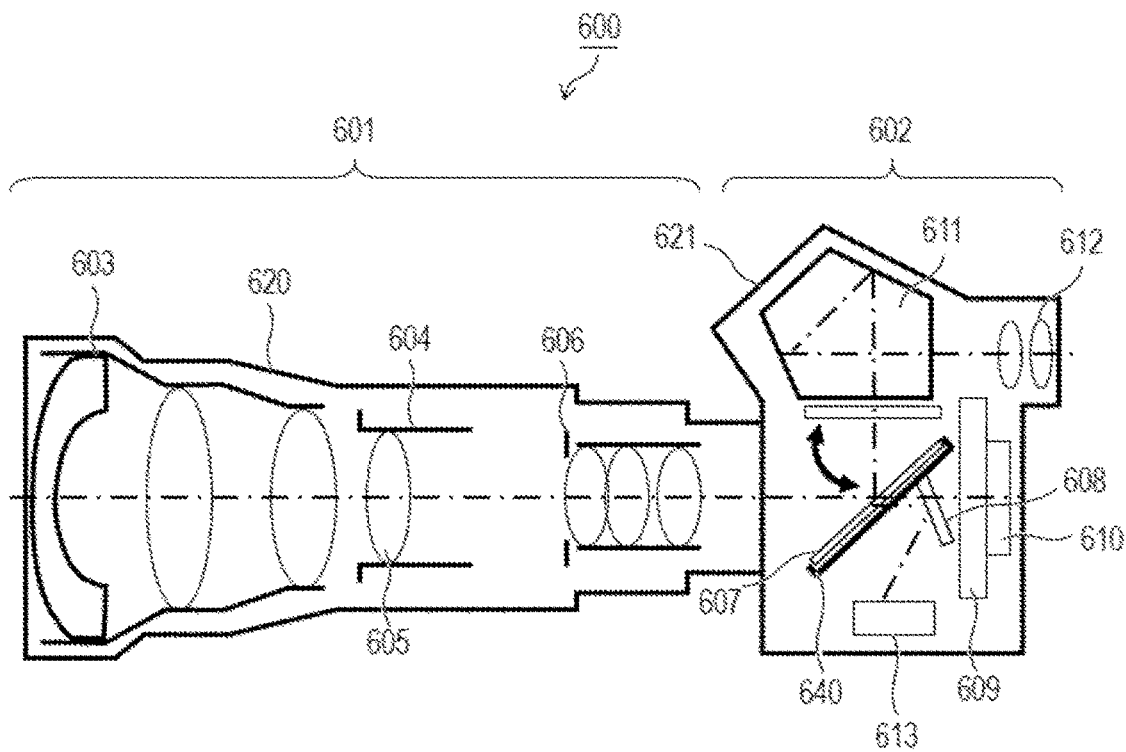
FIG. 3 is a schematic configuration diagram of a single-lens reflex digital camera 600, which is an embodiment of the present invention.

FIG. 3 is a schematic configuration diagram of a single-lens reflex digital camera 600, which is an embodiment of the present invention. In FIG. 3, the camera body 602 and the lens barrel 601 are coupled, and the lens barrel 601 is an interchangeable lens that can be attached to and detached from the camera body 602.

The light from the subject passes through the optical system including multiple lenses 603, 605, and the like arranged on the optical axis of the capturing optical system inside the housing of the lens barrel 601 (inside the housing 620), and is received by the image pickup element 610.

The lens 605 is movably supported by the inner cylinder 604 with respect to the outer cylinder of the lens barrel 601 for focusing and zooming.

During the observation period before capturing, the light from the subject is reflected by the main mirror 607 in the housing of the camera body 602 (inside the housing 621), and passes through the prism 611, and then the captured image is projected to the photographer through the finder lens 612. The main mirror 607 is, for example, a half mirror, and the light transmitted through the main mirror 607 is reflected by the sub mirror 608 in the direction of the AF (autofocus) unit 613, and this reflected light is used for distance measurement, for example. Further, the main mirror 607 is attached and supported on the main mirror holder 640 by adhesion or the like. At the time of capturing, the main mirror 607 and the sub mirror 608 are moved out of the optical path via a not-illustrated drive mechanism, the shutter 609 is opened, and the image pickup element 610 is allowed to form a captured light image incident from the lens barrel 601. Further, the aperture 606 is configured so that the brightness and the depth of focus at the time of capturing can be changed by changing the aperture area.

The resin molded body according to the embodiment of the present invention can be used for the housing 620 and the housing 621. Since the resin molded body according to the embodiment of the present invention has a small coefficient of linear expansion, it is possible to provide an optical device having a small volume change due to a temperature change.

EXAMPLES

The raw materials used in the Examples and Comparative Examples are as follows.

(Negative Thermal Expansion Metal Oxide Particles A)

<A-1>

$Bi_2O_3$ at 3.7040 g, Ni at 0.8788 g, and $Fe(NO_3)_3 \cdot 9H_2O$ at 0.9807 g were dissolved in 50 ml of a 35% nitric acid solution and evaporated to dryness with stirring with a stirrer. The obtained powder was heat-treated in air at 750° C., and then potassium perchlorate was mixed as an oxidizing agent so as to make up 20% by mass of the whole, followed by encapsulation in a gold capsule. The capsule was treated with a high pressure synthesizer under the conditions of 60,000 atm and 750° C. for 30 minutes. The obtained sample was washed with water to remove potassium chloride, and a metal oxide $BiNi_{0.85}Fe_{0.15}O_3$ exhibiting negative thermal expansion was synthesized.

The metal oxide was pulverized in an agate mortar for 10 minutes to obtain negative thermal expansion metal oxide particles A-1. When the particle diameter was measured with an optical microscope, the number average particle diameter was 0.86 μm.

In addition, these particles were subjected to X-ray diffractometry, followed by fitting calculation by Rietveld analysis. The value of the coefficient of linear expansion in the range of 0° C. to 60° C. calculated from the changes in the crystal phase fraction and the lattice constant was −187 ppm/° C. This coefficient of linear expansion is a theoretical value specific to the material excluding the influence of voids and micro defects that may be contained in the solid particles.

<A-2>

Negative thermal expansion metal oxide particles A-2 were synthesized under the same conditions except that the synthesis condition of A-1 was changed to 40,000 atm. The value of the coefficient of linear expansion was −146 ppm/° C.

(Protective Layer Forming Material B)

<B-1>

A silane coupling agent having an epoxy functional group containing 3-glycidoxypropyltrimethoxysilane as the main component (trade name: OFS-6040, manufactured by Dow Corning Toray Co., Ltd.)

<B-2>

A silane coupling agent having an epoxy functional group containing 3-glycidoxypropylmethyldimethoxysilane as the main component (trade name: KBM-402, manufactured by Shin-Etsu Chemical Co., Ltd.)

<B-3>

A silane coupling agent having an amino functional group containing 3-(2-aminoethylamino)propyltrimethoxysilane as the main component (trade name: OFS-6020, manufactured by Dow Corning Toray Co., Ltd.)

<B-4>

A silane coupling agent having an amino functional group containing 3-aminopropyltriethoxysilane as the main component (trade name: KBE-903, manufactured by Shin-Etsu Chemical Co., Ltd.)

<B-5>

A silane coupling agent having a methacryl functional group containing 3-methacryloxypropyltrimethoxysilane as the main component (trade name: OFS-6030, manufactured by Dow Corning Toray Co., Ltd.)
(Thermoplastic Resin C)
<C-1>

An optical polycarbonate (trade name: AD-5503, Panlite manufactured by Teijin Limited, coefficient of linear expansion at 0° C. to 60° C. is 74 ppm/° C.)
<C-2>

An optical cycloolefin resin (trade name: ZEONEX E48R, manufactured by ZEON Corporation, coefficient of linear expansion at 0° C. to 60° C. is 63 ppm/° C.)

The coefficient of linear expansion of the thermoplastic resins C-1 and C-2 at 0° C. to 60° C. was determined as follows.

A 6 mm square through hole is opened in the center of the cylinder, and a press mold that can be sealed with a mirror surface piece from the upper and lower surfaces of the through hole was prepared. The through hole portion of the press mold was filled with the obtained thermoplastic resin C, and the upper and lower portions thereof were sealed with a mirror surface piece. A hot press machine (trade name: AH-10TD, manufactured by AS ONE Corporation) was used to apply a pressure of 500 kg in the vertical direction, and press molding was performed at 160° C. to prepare a rectangular molded body.

This rectangular molded body was left at 80° C. for 10 minutes to remove its molding stress, and a thermomechanical analyzer (TMA) (trade name: Q400, manufactured by TA Instruments) was used to measure the coefficient of linear expansion. In the measurement of the coefficient of linear expansion, the temperature raising and lowering process including the section from 0° C. to 60° C. was performed for 3 cycles at a rate of 5° C./min in each of the press direction and the press vertical direction of the molded body, and the average value thereof was measured.

(Method of Forming Protective Layer)

A protective layer was formed on the surface of the negative thermal expansion metal oxide particles A by the wet method. The negative thermal expansion metal oxide particles A at 1.0 g was added to 1 ml of a 1:9 mixed solution of water and ethanol, stirred with a stirrer for 10 minutes, and then ultrasonically treated for 5 minutes to obtain a slurry.

While stirring this slurry, 20 mg of the protective layer forming material B was added dropwise with a microsyringe, and the stirring was continued for 10 minutes. After stirring, the particles were allowed to stand to settle, the supernatant was removed, and the mixture was washed twice with 5 ml of ethanol. The solid matter obtained after washing was heated at 120° C. for 1 hour to allow the dehydration-condensation reaction to proceed. Subsequently, it was vacuum-dried at 120° C., cooled to room temperature, and then pulverized with an agate mortar for 10 minutes to obtain particles having a condensate of the protective layer forming material B on the surface.

The particles obtained here were measured for mass change from room temperature to 500° C. using thermogravimetric analysis (TGA) (trade name: Q500, manufactured by TA Instruments), and the ash content was calculated. When the protective layer forming materials B-1 to B-4 were used, the ash content was 98%, and it was confirmed that a condensate of the protective layer forming materials B-1 to B-4 equivalent to 2% by mass was provided. On the other hand, when the protective layer forming material B-5 was used, the ash content was 99.6%, and it was confirmed that a condensate of the protective layer forming material B5 equivalent to 0.4% by mass was provided.

(Production and Molding of Resin Composition)

Example 1

As a thermoplastic resin, 0.135 g of crushed pellets of optical polycarbonate C-1 was dissolved at 50° C. using 2 ml of tetrahydrofuran as a solvent. To this solution, 0.368 g of the negative thermal expansion metal oxide particles A-2 having a protective layer formed of the protective layer forming material B-1 containing epoxy functional groups were added, and the mixture was stirred with a stirrer for 10 minutes and then sonicated for 5 minutes. The solvent was volatilized by raising the temperature to the boiling point while stirring with a stirrer, vacuum-dried at 120° C., cooled to room temperature, and then pulverized with an agate mortar for 10 minutes to obtain a resin composition.

A 6 mm square through hole is opened in the center of the cylinder, and a press mold that can be sealed with a mirror surface piece from the upper and lower surfaces of the through hole was prepared. The through hole portion of the press mold was filled with the obtained resin composition, and the upper and lower portions thereof were sealed with a mirror surface piece. A hot press machine (trade name: AH-10TD, manufactured by AS ONE Corporation) was used to apply a pressure of 500 kg in the vertical direction, and press molding was performed at 160° C. to prepare a rectangular molded body.

This rectangular molded body was left at 80° C. for 10 minutes to remove its molding stress, and a thermomechanical analyzer (TMA) (trade name: Q400, manufactured by TA Instruments) was used to measure the coefficient of linear expansion. In the measurement of the coefficient of linear expansion, the temperature raising and lowering process including the section from 0° C. to 60° C. was performed for 3 cycles at a rate of 5° C./min in each of the press direction and the press vertical direction of the molded body, and the average value thereof was measured.

Example 2

A resin composition and a molded body were prepared under the same conditions as in Example 1 except that the protective layer forming material B of Example 1 was changed from B-1 to B-2, and the coefficient of linear expansion was measured.

Example 3

A resin composition and a molded body were prepared under the same conditions as in Example 1 except that the protective layer forming material B of Example 1 was changed from B-1 to B-3, and the coefficient of linear expansion was measured.

Example 4

A resin composition and a molded body were prepared under the same conditions as in Example 1 except that the protective layer forming material B of Example 1 was changed from B-1 to B-4, and the coefficient of linear expansion was measured.

Example 5

A resin composition and a molded body were prepared under the same conditions as in Example 1 except that the amount of crushed pellets of the optical polycarbonate C-1 of Example 1 was changed to 0.121 g, and the amount of the negative thermal expansion metal oxide particles A-2 was changed to 0.505 g, and the coefficient of linear expansion was measured.

Example 6

A resin composition and a molded body were prepared under the same conditions as in Example 1 except that the thermoplastic resin C of Example 1 was changed from the crushed pellets of the optical polycarbonate C-1 to 0.114 g of the crushed ones of C-2, and the solvent was changed from tetrahydrofuran to o-xylene, and the coefficient of linear expansion was measured.

Example 7

A resin composition and a molded body were prepared under the same conditions as in Example 1 except that the metal oxide particles of Example 1 were changed from A-2 to A-1, and the coefficient of linear expansion was measured.

Example 8

A molded body was prepared under the same conditions except that the press molding temperature of Example 1 was changed to 190° C., and the coefficient of linear expansion was measured.

Example 9

A molded body was prepared under the same conditions except that the press molding temperature of Example 1 was changed to 250° C., and the coefficient of linear expansion was measured.

Comparative Example 1

A resin composition and a molded body were prepared under the same conditions except that the negative thermal expansion metal oxide particles A-2 having a protective layer formed of the protective layer forming material B-1 containing epoxy functional groups of Example 1 were changed to 0.344 g of negative thermal expansion metal oxide particles A-2 without a protective layer formed thereon, and the coefficient of linear expansion was measured.

Comparative Example 2

A resin composition and a molded body were prepared under the same conditions except that the negative thermal expansion metal oxide particles A-2 having a protective layer formed of the protective layer forming material B-1 containing epoxy functional groups of Example 6 were changed to 0.339 g of negative thermal expansion metal oxide particles A-2 without a protective layer formed thereon, and the coefficient of linear expansion was measured.

Comparative Example 3

A resin composition and a molded body were prepared under the same conditions except that the negative thermal expansion metal oxide particles A-2 having a protective layer formed of the protective layer forming material B-1 containing epoxy functional groups of Example 9 were changed to 0.344 g of negative thermal expansion metal oxide particles A-2 without a protective layer by a silane coupling agent formed thereon, and the coefficient of linear expansion was measured.

(Changes in Particle Performance Before and After Compounding)

As for Example 1 to Example 9 and Comparative Example 1 to Comparative Example 3, Table 1 summarizes the coefficients of linear expansion of the thermoplastic resin and negative thermal expansion metal oxide particles before compounding, the coefficients of linear expansion of the molded body obtained by molding the resin composition after compounding, and the coefficients of linear expansion of the negative thermal expansion metal oxide particles after compounding which are converted assuming that linear additivity holds for the particle volume concentration. Note that "Particle" in Table 1 refers to the "negative thermal expansion metal oxide particles."

Here, the case where linear additivity holds means, for example, the case where the coefficient of linear expansion of a composition is the same as the sum of the products of the coefficients of linear expansion and volume fractions of the constituents. It is generally known that due to the influence of the interaction between the constituents of a composition, the difference in elastic modulus, and the like, there is a difference between the coefficient of linear expansion of the composition and the sum of the products of the coefficients of linear expansion and volume fractions of the constituents, but under the conditions of the volume concentration of the resin molded body of the present invention as well as the thermoplastic resin and negative thermal expansion metal oxide particles in the resin molded body, a roughly approximate relationship is established.

TABLE 1

| | Compounding Condition | | | | Coefficient of Linear Expansion Before Compounding | | Coefficient of Linear Expansion After Compounding | |
|---|---|---|---|---|---|---|---|---|
| | Particle | | Protective Layer Forming Material | Resin Type | Processing Temperature (° C.) | Thermoplastic Resin (ppm/° C.) | Particle (ppm/° C.) | Molded Body Measured value (ppm/° C.) | Particle Converted Value (ppm/° C.) |
| | Type | Concentration (vol. %) | | | | | | | |
| Example 1 | A-2 | 25 | B-1 | C-1 | 160 | 74 | −146 | 23 | −130 |
| Example 2 | A-2 | 25 | B-2 | C-1 | 160 | 74 | −146 | 25 | −122 |
| Example 3 | A-2 | 25 | B-3 | C-1 | 160 | 74 | −146 | 24 | −126 |

TABLE 1-continued

| | Compounding Condition | | | | | Coefficient of Linear Expansion Before Compounding | | Coefficient of Linear Expansion After Compounding | |
|---|---|---|---|---|---|---|---|---|---|
| | Particle | | Protective Layer Forming Material | Resin Type | Processing Temperature (° C.) | Thermoplastic Resin (ppm/° C.) | Particle (ppm/° C.) | Molded Body Measured value (ppm/° C.) | Particle Converted Value (ppm/° C.) |
| | Type | Concentration (vol. %) | | | | | | | |
| Example 4 | A-2 | 25 | B-4 | C-1 | 160 | 74 | −146 | 25 | −122 |
| Example 5 | A-2 | 33 | B-1 | C-1 | 160 | 74 | −146 | 6 | −132 |
| Example 6 | A-2 | 23 | B-1 | C-2 | 160 | 63 | −146 | 25 | −102 |
| Example 7 | A-1 | 25 | B-1 | C-1 | 160 | 74 | −187 | 11 | −178 |
| Comparative Example 1 | A-2 | 25 | Unformed | C-1 | 160 | 74 | −146 | 33 | −90 |
| Comparative Example 2 | A-2 | 23 | Unformed | C-2 | 160 | 63 | −146 | 31 | −76 |
| Example 8 | A-2 | 25 | B-1 | C-1 | 190 | 74 | −146 | 20 | −142 |
| Example 9 | A-2 | 25 | B-1 | C-1 | 250 | 74 | −146 | 45 | −42 |
| Comparative Example 3 | A-2 | 25 | Unformed | C-1 | 250 | 74 | −146 | 56 | 2 (Deactivated) |

In the comparison between Example 1 and Comparative Example 1, when the protective layer is formed, the change in the coefficient of linear expansion of the particles before and after the compounding is small, indicating that a molded body having a small coefficient of linear expansion is obtained.

In Examples 1 to 4, the type of the treatment agent that protects the surface of the negative thermal expansion metal oxide particles is changed. In Examples 1 to 4 using the protective layer forming material having epoxy functional groups or amino functional groups, the change in the coefficient of linear expansion of the negative thermal expansion metal oxide particles before and after the compounding was small. This indicates that a protective layer forming material having epoxy functional groups or amino functional groups was more preferably used because the coupling reaction proceeded efficiently even under neutral conditions that did not denature the negative thermal expansion metal oxide particles.

Example 5 is the result when the volume fraction of the negative thermal expansion metal oxide particles in the total components of the resin composition is 33% by volume. The coefficient of linear expansion of the molded body of Example 5 was a low coefficient of linear expansion of 1/10 or less of that of the thermoplastic resin before compounding.

Further, from the results of Example 1, Example 6, and Comparative Example 2, it was confirmed that the protective layer exerted its effects regardless of the type of the thermoplastic resin.

Example 9 and Comparative Example 3 show that the processing temperature in press molding was particularly high at 250° C., and the thermal deterioration of the negative thermal expansion metal oxide particles proceeded in both cases, but in Example 9, in which the protective layer was formed, the coefficient of linear expansion of the molded body after the compounding was suppressed to a smaller value.

From the above, it can be confirmed that the present invention makes it possible to suppress the functional deterioration of the negative thermal expansion metal oxide particles at the time of compounding with the thermoplastic resin, and to obtain a resin composition having lower thermal expansion property.

According to the present invention, a material having a lower thermal expansion property is provided, in which the functional deterioration of metal oxide particles having a negative thermal expansion property at the time of compounding with a thermoplastic resin is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A resin composition comprising:
   metal oxide particles with a negative coefficient of linear expansion at 0° C. to 60° C.; and
   a thermoplastic resin with a positive coefficient of linear expansion at 0° C. to 60° C.,
   wherein:
   the metal oxide particles change in metal element valence during crystal phase transition;
   a surface of the metal oxide particles is provided with a compound containing at least one metal element selected from the group consisting of Si, Al, and Ti;
   the compound containing the metal element is a condensate of an alkoxide compound represented by formula (1) or (2):

$$\mathrm{SiR1}_{n1}\mathrm{R2}_{m1} \tag{1}$$

wherein:
   R1 is a functional group selected from the group consisting of a methyl group, a methoxy group, and an ethoxy group;
   R2 is a functional group having 8 or less carbon atoms and having an end portion selected from the group consisting of any one of epoxy, amine, imine, and (meth) acryloxy groups;
   n1 is a positive integer;
   m1 is a positive integer or 0; and
   n1+m1 is 4;

$$\mathrm{M}^4\mathrm{R3}_{n2}\mathrm{R4}_{m2} \tag{2},$$

wherein:
   $M^4$ is Al or Ti;

R3 is a functional group selected from the group consisting of an alkyl group having 8 or less carbon atoms and an alkoxy group having 8 or less carbon atoms;

R4 is a functional group having 8 or less carbon atoms and having an end portion selected from the group consisting of any one of epoxy, amine, imine, and (meth)acryloxy groups, phosphoric acid ester, and sulfonic acid ester;

when $M^4$ is Al, n2 is a positive integer, m2 is a positive integer or 0, and n2+m2 is 3; and when M4 is Ti, n2 is a positive integer, m2 is a positive integer or 0, and n2+m2 is 4; and the metal oxide particles are particles of a metal oxide represented by formula (A) or (B):

$$(Bi_{1-x1}M^1_{x1})(Ni_{1-x2}M^2_{x2})O_y \quad (A),$$

wherein:

$M^1$ is at least one metal element selected from the group consisting of lanthanoids, Y, and In;

$M^2$ is at least one metal element selected from the group consisting of Al, V, Cr, Mn, Fe, Co, Ga, and Sb;

x1, x2, and y are such that x1 is 0.02 to 0.15, x2 is 0.02 to 0.50, and y is 3 or less;

$$BiNi_{1-x}M^3_xO_y \quad (B),$$

wherein:

$M^3$ is at least one metal element selected from the group consisting of Al, V, Cr, Mn, Fe, Co, Ga, and Sb;

x is 0.02 to 0.50; and y is 3 or less.

2. The resin composition according to claim 1, wherein a volume fraction of the metal oxide particles in the resin composition is 23% by volume to 33% by volume.

3. The resin composition according to claim 1, wherein the thermoplastic resin is at least one selected from the group consisting of a polycarbonate resin and a cycloolefin resin.

4. A resin molded body comprising:
metal oxide particles with a negative coefficient of linear expansion at 0° C. to 60° C.; and
a resin with a positive coefficient of linear expansion at 0° C. to 60° C.,
wherein:
the metal oxide particles change in metal element valence during crystal phase transition;
a surface of the metal oxide particles is provided with a compound containing at least one metal element selected from the group consisting of Si, Al, and Ti;
the compound containing the metal element is a condensate of an alkoxide compound represented by formula (1) or (2):

$$SiR1_{n1}R2_{m1} \quad (1)$$

wherein:

R1 is a functional group selected from the group consisting of a methyl group, a methoxy group, and an ethoxy group;

R2 is a functional group having 8 or less carbon atoms and having an end portion selected from the group consisting of any one of epoxy, amine, imine, and (meth)acryloxy groups;

n1 is a positive integer;

m1 is a positive integer or 0; and n1+m1 is 4;

$$M^4R3_{n2}R4_{m2} \quad (2),$$

wherein:

$M^4$ is Al or Ti;

R3 is a functional group selected from the group consisting of an alkyl group having 8 or less carbon atoms and an alkoxy group having 8 or less carbon atoms;

R4 is a functional group having 8 or less carbon atoms and having an end portion selected from the group consisting of any one of epoxy, amine, imine, and (meth)acryloxy groups, phosphoric acid ester, and sulfonic acid ester;

when $M^4$ is Al, n2 is a positive integer, m2 is a positive integer or 0, and n2+m2 is 3; and when $M^4$ is Ti, n2 is a positive integer, m2 is a positive integer or 0, and n2+m2 is 4; and the metal oxide particles are particles of a metal oxide represented by formula (A) or (B):

$$(Bi_{1-x1}M^1_{x1})(Ni_{1-x2}M^2_{x2})O_y \quad (A),$$

wherein:

$M^1$ is at least one metal element selected from the group consisting of lanthanoids, Y, and In;

$M^2$ is at least one metal element selected from the group consisting of Al, V Cr, Mn, Fe, Co, Ga, and Sb;

x1, x2, and y are such that x1 is 0.02 to 0.15, x2 is 0.02 to 0.50, and y is 3 or less;

$$BiNi_{1-x}M^3_xO_y \quad (B),$$

wherein:

$M^3$ is at least one metal element selected from the group consisting of Al, V, Cr, Mn, Fe, Co, Ga, and Sb;

x is 0.02 to 0.50; and y is 3 or less.

5. The resin molded body according to claim 4, wherein a coefficient of linear expansion of the resin molded body at 0° C. to 60° C. is greater than 0 ppm/° C. to 45 ppm/° C.

6. A method of producing a resin molded body which includes metal oxide particles with a negative coefficient of linear expansion at 0° C. to 60° C. and a resin with a positive coefficient of linear expansion at 0° C. to 60° C., wherein the metal oxide particles change in metal element valence during crystal phase transition, the method comprising:
providing a compound containing at least one metal element selected from the group consisting of Si, Al, and Ti on a surface of the metal oxide particles;
mixing the metal oxide particles provided with the compound with the resin; and
molding the resin mixed with the metal oxide particles provided with the compound at a temperature of 100° C. to 300° C.,
wherein the compound containing the metal element is a condensate of an alkoxide compound represented by formula (1) or (2):

$$SiR1_{n1}R2_{m1} \quad (1),$$

wherein:

R1 is a functional group selected from the group consisting of a methyl group, a methoxy group, and an ethoxy group;

R2 is a functional group having 8 or less carbon atoms and having an end portion selected from the group consisting of any one of epoxy, amine, imine, and (meth)acryloxy groups;

n1 is a positive integer;

m1 is a positive integer or 0; and n1+m1 is 4;

$$M^4R3_{n2}R4_{m2} \quad (2),$$

wherein:

$M^4$ is Al or Ti;

R3 is a functional group selected from the group consisting of an alkyl group having 8 or less carbon atoms and an alkoxy group having 8 or less carbon atoms;

R4 is a functional group having 8 or less carbon atoms and having an end portion selected from the group consisting of any one of epoxy, amine, imine, and (meth) acryloxy groups, phosphoric acid ester, and sulfonic acid ester;

when $M^4$ is Al, n2 is a positive integer, m2 is a positive integer or 0, and n2+m2 is 3; and when $M^4$ is Ti, n2 is a positive integer, m2 is a positive integer or 0, and n2+m2 is 4, and wherein the metal oxide particles are particles of a metal oxide represented by formula (A) or (B):

$$(Bi_{1-x1}M^1_{x1})(Ni_{1-x2}M^2_{x2})O_y \quad (A),$$

wherein:

$M^1$ is at least one metal element selected from the group consisting of lanthanoids, Y, and In;

$M^2$ is at least one metal element selected from the group consisting of Al, V, Cr, Mn, Fe, Co, Ga, and Sb;

x1, x2, and y are such that x1 is 0.02 to 0.15, x2 is 0.02 to 0.50, and y is 3 or less;

$$BiNi_{1-x}M^3_xO_y \quad (B),$$

wherein:

$M^3$ is at least one metal element selected from the group consisting of Al, V, Cr, Mn, Fe, Co, Ga, and Sb;

x is 0.02 to 0.50; and y is 3 or less.

7. A lens barrel comprising:
a housing; and
an optical system including a plurality of lenses arranged within the housing,
wherein the housing is made of the resin molded body according to claim 4.

8. A catoptric element comprising:
a base material; and
a reflective film provided on the base material,
wherein the base material is made of the resin molded body according to claim 4.

9. The resin composition according to claim 1, wherein the thermoplastic resin includes cycloolefin resin.

10. A resin molded body produced by the method according to claim 6.

11. A lens barrel comprising:
a housing; and
an optical system including a plurality of lenses arranged within the housing,
wherein the housing is made of the resin molded body according to claim 10.

12. A catoptric element comprising:
a base material; and
a reflective film provided on the base material,
wherein the base material is made of the resin molded body according to claim 10.

13. A resin composition comprising:
metal oxide particles having a negative coefficient of linear expansion at 0° C. to 60° C. and represented by formula (B): $BiNi_{1-x}Fe_xO_3$ (B), where x is 0.02 to 0.50; and a thermoplastic resin with a positive coefficient of linear expansion at 0° C. to 60° C., wherein the metal oxide particles change in metal element valence during crystal phase transition, and a surface of the metal oxide particles is provided with a protective layer containing Si, wherein the protective layer is a condensate of an alkoxide compound having one functional group selected from the group consisting of an epoxy functional group, an amino functional group, and a methacryl functional group, the alkoxide compound reacting under neutral conditions, and wherein a converted value of a coefficient of linear expansion of the metal oxide particles in the thermoplastic resin is −178 ppm/° C. to −42 ppm/° C.

14. A resin molded body comprising:
a molded body having the resin composition according to claim 13,
wherein a coefficient of linear expansion of the resin molded body at 0° C. to 60° C. is greater than 0 ppm/° C. and 45 ppm/° C. or less.

15. A device comprising:
a member; and
the resin composition according to claim 13 configured to be arranged with the member,
wherein thermal expansion of the member is suppressed.

16. A device comprising:
a member; and
the resin molded body according to claim 14 configured to be arranged with the member,
wherein thermal expansion of the member is suppressed.

* * * * *

UNITED STATES PATENT AND TRADEMARK OFFICE
CERTIFICATE OF CORRECTION

PATENT NO. : 12,479,972 B2
APPLICATION NO. : 17/575896
DATED : November 25, 2025
INVENTOR(S) : Masaki Azuma et al.

It is certified that error appears in the above-identified patent and that said Letters Patent is hereby corrected as shown below:

On the Title Page (73), Assignees:
"INSTITUTE OF SCIENCE TOKYO, Tokyo (JP); KANAWA INSTITUTE OF INDUSTRIAL SCIENCE AND TECHNOLOGY, Ebina (JP); CANON KABISHIKI KAISHA, Tokyo (JP)"

Should read:
--INSTITUTE OF SCIENCE TOKYO, Tokyo (JP); KANAGAWA INSTITUTE OF INDUSTRIAL SCIENCE AND TECHNOLOGY, Ebina (JP); CANON KABUSHIKI KAISHA, Tokyo (JP)--.

Signed and Sealed this
Twenty-seventh Day of January, 2026

John A. Squires
*Director of the United States Patent and Trademark Office*